(12) United States Patent
Rief et al.

(10) Patent No.: US 10,347,954 B2
(45) Date of Patent: Jul. 9, 2019

(54) FLEXIBLE BATTERY CELL RETAINER

(71) Applicant: HUSQVARNA AB, Huskvarna (SE)

(72) Inventors: Joachim Rief, Ehingen (DE); Tobias Zeller, Neu-Ulm (DE)

(73) Assignee: HUSQVARNA AB, Huskvarna (SE)

( * ) Notice: Subject to any disclaimer, the term of this patent is extended or adjusted under 35 U.S.C. 154(b) by 116 days.

(21) Appl. No.: 15/032,901

(22) PCT Filed: Oct. 30, 2013

(86) PCT No.: PCT/SE2013/051269
§ 371 (c)(1),
(2) Date: Apr. 28, 2016

(87) PCT Pub. No.: WO2015/065254
PCT Pub. Date: May 7, 2015

(65) Prior Publication Data
US 2016/0285143 A1 Sep. 29, 2016

(51) Int. Cl.
*H01M 10/6235* (2014.01)
*H01M 10/643* (2014.01)
(Continued)

(52) U.S. Cl.
CPC ..... *H01M 10/6235* (2015.04); *H01M 2/1055* (2013.01); *H01M 10/613* (2015.04);
(Continued)

(58) Field of Classification Search
CPC ........... H01M 2/1055; H01M 10/6563; H01M 10/613; H01M 10/643; H01M 10/6235; H01M 10/6566
(Continued)

(56) References Cited

U.S. PATENT DOCUMENTS 6,051,336 A 4/2000 Dougherty et al.
6,174,618 B1 * 1/2001 Nishiyama ............ H01M 2/105
429/100
(Continued)

FOREIGN PATENT DOCUMENTS

CN 201518584 U 7/2010
CN 201626640 U 11/2010
(Continued)

OTHER PUBLICATIONS

International Search Report and Written Opinion for International Application No. PCT/SE2013/051269 dated Jun. 24, 2014, all enclosed pages cited.

(Continued)

*Primary Examiner* — Jonathan G Jelsma
*Assistant Examiner* — Omar M Kekia
(74) *Attorney, Agent, or Firm* — Burr Forman McNair

(57) ABSTRACT

A cell retainer assembly (130) for a battery powered, outdoor power equipment device includes a plurality of cell reception slots (140) configured to receive and retain respective ones of battery cells (120) and a plurality of cell retention structures (180). At least some of the cell reception slots (140) are formed by corresponding ones of the cell retention structures (180). At least one cell retention structure (180) are configured to extend around a periphery of a portion of a corresponding battery cell (120) inserted therein. The cell retention structure includes a series of cell engaging portions (184) separated from each other by respective spacing portions (188). The at least one cell retention structure (180) may be formed of flexible material.

18 Claims, 5 Drawing Sheets

(51) Int. Cl.
*H01M 10/613* (2014.01)
*H01M 2/10* (2006.01)
*H01M 10/6563* (2014.01)
*H01M 10/6566* (2014.01)

(52) U.S. Cl.
CPC ..... *H01M 10/643* (2015.04); *H01M 10/6563* (2015.04); *H01M 10/6566* (2015.04)

(58) Field of Classification Search
USPC .......................................................... 429/71
See application file for complete search history.

(56) References Cited

U.S. PATENT DOCUMENTS

| | | | |
|---|---|---|---|
| 7,998,611 B2 | 8/2011 | Yoshihara et al. | |
| 2002/0028376 A1* | 3/2002 | Yamane | B60L 11/1874 429/120 |
| 2003/0193313 A1 | 10/2003 | Takedomi et al. | |
| 2010/0266886 A1 | 10/2010 | Joswig et al. | |
| 2011/0039142 A1* | 2/2011 | Kwag | H01M 2/105 429/99 |
| 2013/0099039 A1 | 4/2013 | Gaudreault | |

FOREIGN PATENT DOCUMENTS

| | | | |
|---|---|---|---|
| EP | 2290731 A1 * | 2/2011 | ............. H01M 2/10 |
| EP | 2290731 A1 | 3/2011 | |
| EP | 2398108 A1 | 12/2011 | |
| EP | 2787559 A1 | 10/2014 | |
| JP | H08180854 A | 7/1996 | |
| JP | 10106520 A | 4/1998 | |
| JP | H10127135 A | 5/1998 | |
| JP | 2000188092 A | 7/2000 | |
| JP | 2002084852 A | 3/2002 | |
| JP | 2003068260 A | 3/2003 | |
| JP | 2003308816 A | 10/2003 | |
| JP | 2004171856 A | 6/2004 | |
| JP | 2011049011 A | 3/2011 | |
| JP | 2011146151 A | 7/2011 | |
| JP | 2013110080 A | 6/2013 | |
| JP | 2014203660 A | 10/2014 | |
| WO | 2002009210 A2 | 1/2002 | |
| WO | 2011064956 A1 | 6/2011 | |

OTHER PUBLICATIONS

International Preliminary Report on Patentability for International Application No. PCT/SE2013/051269 dated May 3, 2016, all enclosed pages cited.

* cited by examiner

FLEXIBLE BATTERY CELL RETAINER

TECHNICAL FIELD

Example embodiments generally relate to battery pack technology and, more particularly, relate to mechanisms for retaining cells within a battery pack.

BACKGROUND

Property maintenance tasks are commonly performed using various tools and/or machines that are configured for the performance of corresponding specific tasks. Certain tasks, like cutting trees, trimming vegetation, blowing debris and the like, are typically performed by hand-held tools or power equipment. The hand-held power equipment may often be powered by gas or electric motors. Until the advent of battery powered electric tools, gas powered motors were often preferred by operators that desired, or required, a great deal of mobility. Accordingly, many walk-behind or ride-on outdoor power equipment devices, such as lawn mowers, are often powered by gas motors because they are typically required to operate over a relatively large range. However, as battery technology continues to improve, the robustness of battery powered equipment has also improved and such devices have increased in popularity.

The batteries employed in hand-held power equipment may, in some cases, be removable and/or rechargeable assemblies of a plurality of smaller cells that are arranged together in order to achieve desired output characteristics. However, charging and discharging battery cells causes heat production due to the internal resistance (impedance) of the cells. Therefore, when these cells are arranged together to form a battery pack, it is important to manage the thermal characteristics of the battery pack. Failure to properly manage to do can result in decreased battery performance or total failure of the battery pack. Furthermore, when used with handheld tools or outdoor power equipment, the battery packs may be operated in harsh or at least relatively uncontrolled conditions. Exposure to extreme temperatures, dust/ debris, impact, moisture and other conditions can present challenges for maintaining performance and/or integrity of battery packs.

Therefore, to increase the robustness of battery packs that may be used in relatively inhospitable environments, improvements in battery pack design are likely to be needed.

BRIEF SUMMARY OF SOME EXAMPLES

Some example embodiments may provide a battery pack provided with a flexible cell retention structure that improves airflow within the battery pack and/or mitigates impact damage when the battery pack encounters impact forces. Some example embodiments may also enable cells of different sizes to be employed within a single structure. In this regard, the same cell retention structure may be mass produced and used in battery packs that use respective different cell sizes so that different battery pack ratings can be supported with one structure.

In one example embodiment, a battery pack is provided. The battery pack may include a cell housing configured to retain a plurality of battery cells and a cell retainer assembly forming a plurality of cell reception slots, the cell reception slots being configured to receive and retain respective ones of the battery cells within the cell housing. At least some of the cell reception slots may be formed by a cell retention structure configured to extend around a periphery of a portion of a corresponding battery cell inserted therein. The cell retention structure may include a series of cell engaging portions separated from each other by respective spacing portions. The cell retention structure may be formed of flexible material.

In another example embodiment, a cell retainer assembly for a battery powered, outdoor power equipment device is provided. The cell retainer assembly may include a plurality of cell reception slots configured to receive and retain respective ones of battery cells and a plurality of cell retention structures. At least some of the cell reception slots may be formed by corresponding ones of the cell retention structures. At least one cell retention structure may be configured to extend around a periphery of a portion of a corresponding battery cell inserted therein. The cell retention structure may include a series of cell engaging portions separated from each other by respective spacing portions. The at least one cell retention structure may be formed of flexible material.

Some example embodiments may improve the performance and/or the efficacy of battery powered equipment.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
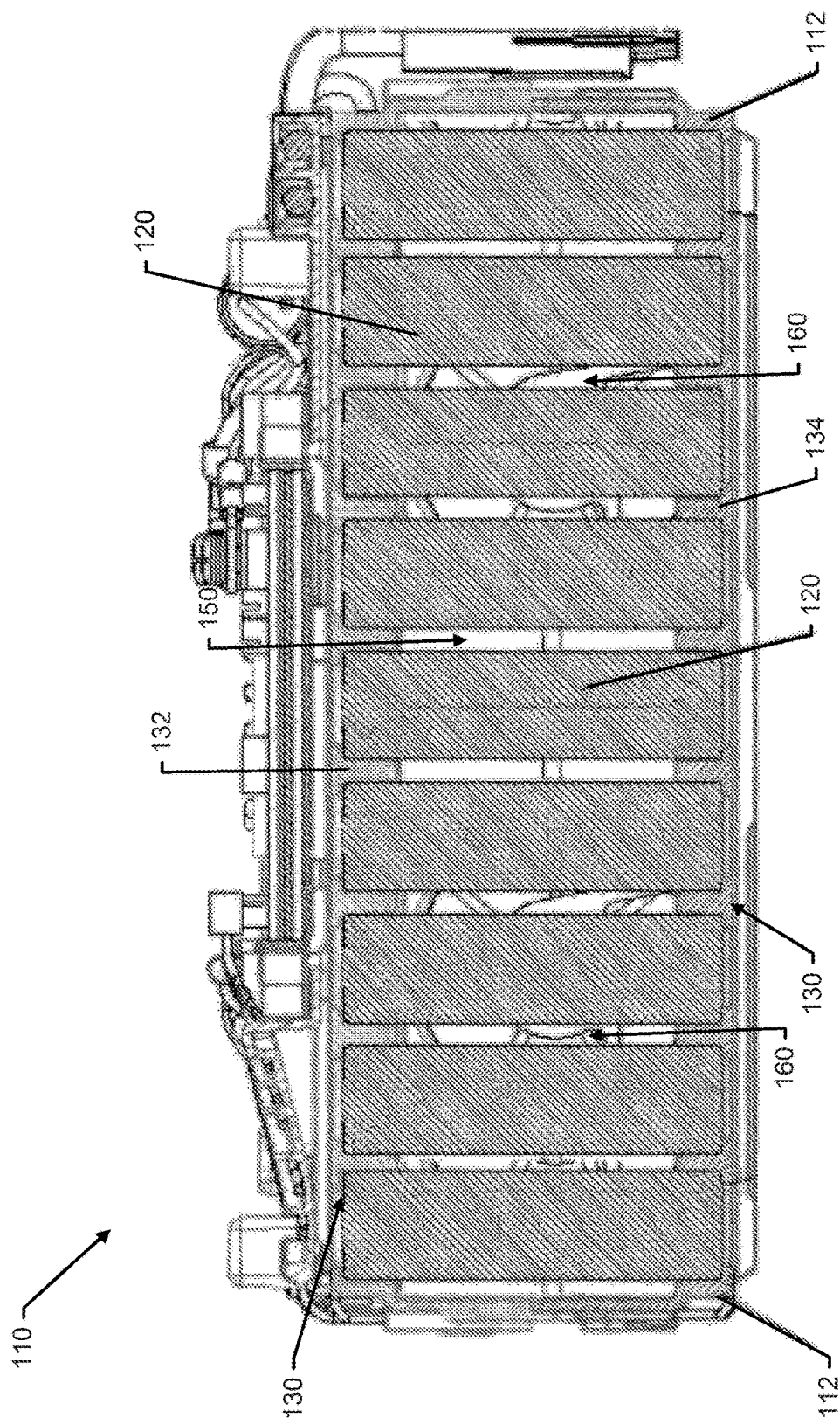
FIG. 1 illustrates top view down into a portion of a battery pack in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection or interaction of components that are operably coupled to each other.

Some example embodiments may provide for a battery pack that can be useful in connection with battery powered tools or battery powered outdoor power equipment. Outdoor power equipment that is battery powered, and battery powered tools generally, typically include battery packs that include a plurality of individual cells. In order to achieve sufficient power, cells are organized and interconnected (e.g., in a series of series and/or parallel connections) to group the cells within a battery pack in a manner that achieves desired characteristics. The battery pack may be inserted into an aperture of the piece of equipment it powers so that the corresponding piece of equipment (e.g., handheld, ride-on, or walk-behind equipment) is enabled to be mobile. However, in some cases, the battery pack may be inserted into a backpack or other carrying implement that the equipment operator may wear.

The cells of the battery pack are often rechargeable, cylindrical shaped cells. However, cells with other shapes, and even replaceable batteries could alternatively be employed in other embodiments. Given that the batteries produce energy via electrochemical reactions that generate heat, the battery pack may tend to heat up during charging or discharging operations. In particular, when the equipment operated by the battery pack is working hard, the discharge rates may be high. High capacity cells also tend to have high internal resistances. Accordingly, since power is equal to the square of current times resistance, it is clear that a high discharge rate will cause high power dissipation, and therefore high temperatures. Likewise, fast charging of the battery pack can also produce high temperatures. Given that cells are typically designed to operate within defined temperature ranges (e.g., −10° C. to +65° C.), temperature increases should be maintained at relatively low levels. If heat generation is excessive, temperatures may reach extreme levels at which cell damage may occur.

The cells may be held in place by a cell retainer assembly. The cell retainer assembly may be comprised of a plurality of cell retainers that each engage and hold a corresponding battery cell. In some cases, the cell retainers within a cell retainer assembly may be defined engagement slots or holes into which the battery cells fit. For cylindrical battery cells, a cylindrically shaped retainer having a diameter slightly larger than the diameter of the battery cell can provide a snug retention mechanism to hold the battery cells in place. However, other geometrical shapes (e.g., hexagonal slots, octagonal slots, etc.) may also be employed within a rigid cell retainer structure. The use of such geometrically shaped, and rigid cell retainer assembly structures can also present some challenges relative to cooling of the battery cells, and may also be less than ideal if an impact is encountered.

In this regard, if the cell retainers are cylindrically shaped for a snug fit all around the circumference of the battery cell, it may be difficult to effectively cool the battery cell. In some cases active cooling of the cells may be undertaken by forcing a cooling fluid (e.g., air) through the cell retainer assembly (e.g., with a fan or pump) to carry heat away from the battery cells. In such cases, the battery cells may be disposed in a pattern such that they are spaced apart from one another to form columns and rows, or some other distributed arrangements. When the cooling fluid is forced into one end of the cell retainer assembly, the flow or cooling fluid around the battery cells may take heat away from the battery cells. However, if the cell retainer tightly engages the battery cell, it may be difficult to cool the contacted surfaces and degradation of air flow at the surface of the battery cells may make it particularly difficult to ensure consistent cooling of battery cells throughout the battery pack.

Additionally, if there is impact on the battery pack, and the battery cells are held relatively tightly together within a series of cell retainers that are rigidly constructed, an impact may be more readily communicated between the cells since there may not be any absorption capability associated with the design. Accordingly, some example embodiments may provide for a cell retainer structure that provides good holding characteristics while still enabling the battery pack to be cooled effectively and mitigate impacts. In this regard, some example embodiments may provide a cell retainer assembly having cell retainers that are defined by flexible materials, and shapes that do not contact the battery cells continuously around the periphery of the battery cells. The lack of continuous contact around the periphery of the battery cells may enable cooling fluid to encounter more of the surface of the battery cells for more effective cooling. Meanwhile, the combination of flexible materials that do not continuously contact the battery cells around the periphery thereof may also allow for expansion and/or contraction of the material forming the cell retainer slots in order to mitigate impact damage and/or improve cooling of the battery cells.

Figure 2:
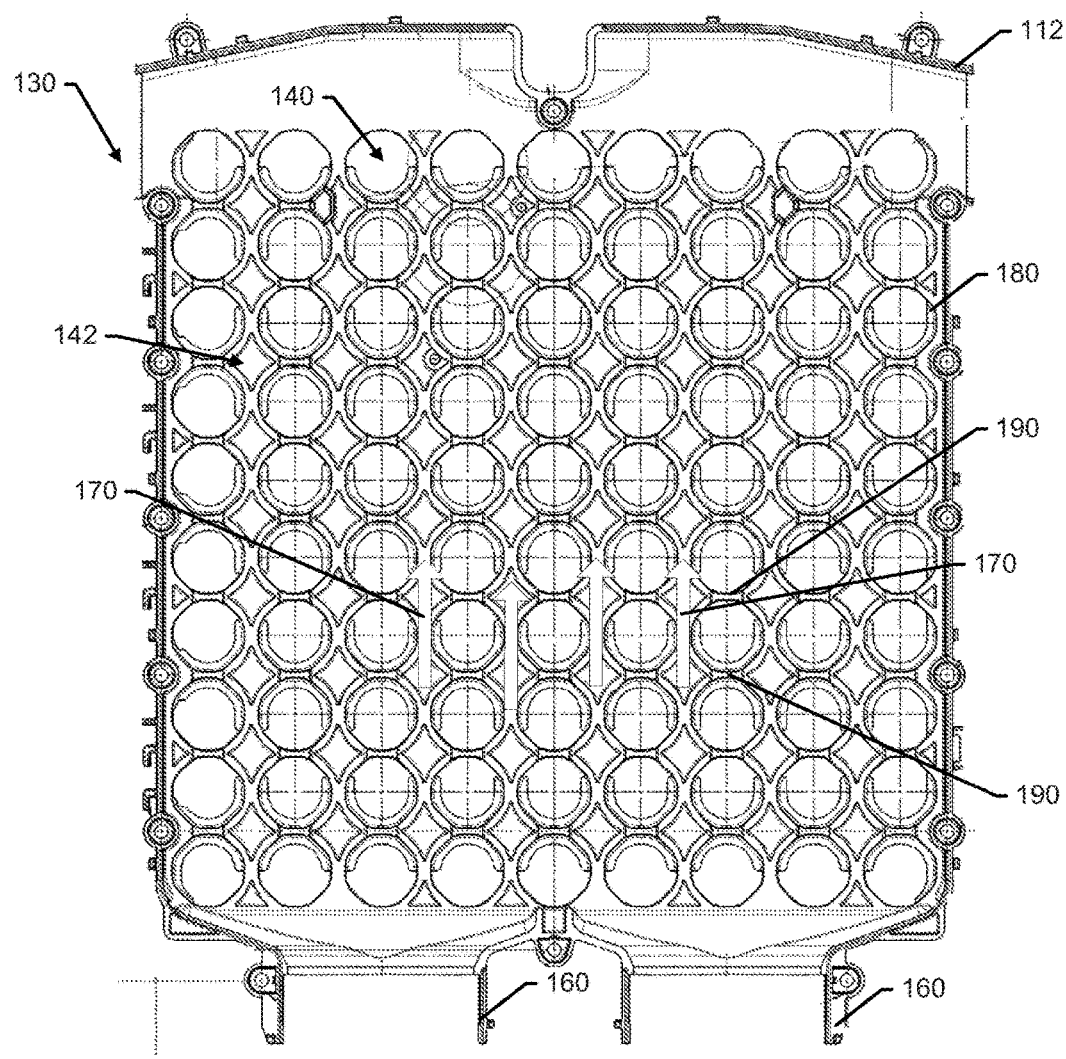
FIG. 2 illustrates a plan view of one portion of a cell retainer assembly of the battery pack in accordance with an example embodiment.
Figure 3:
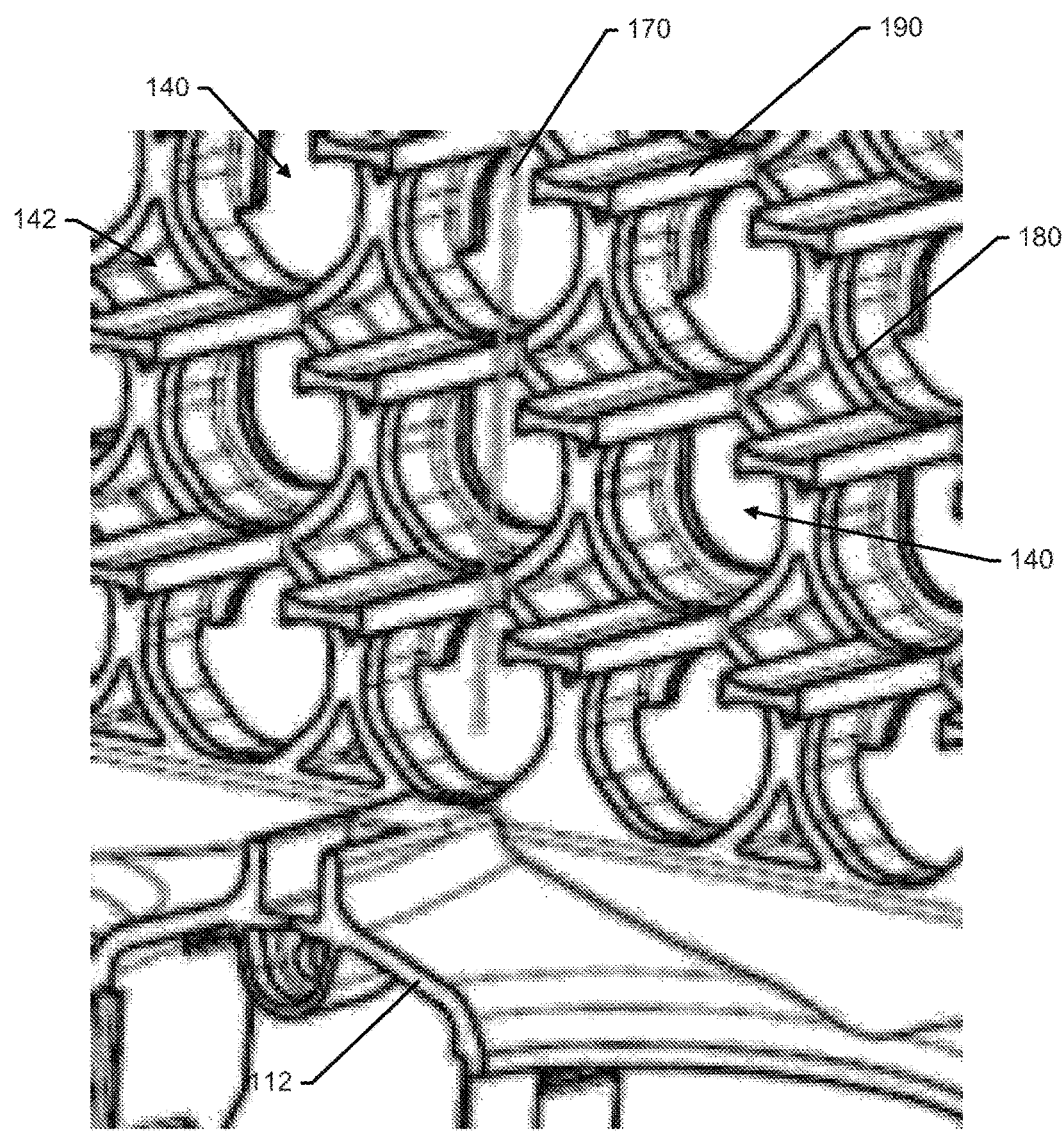
FIG. 3 illustrates a perspective view of the portion of the cell retainer assembly of FIG. 2 in accordance with an example embodiment.
Figure 4:
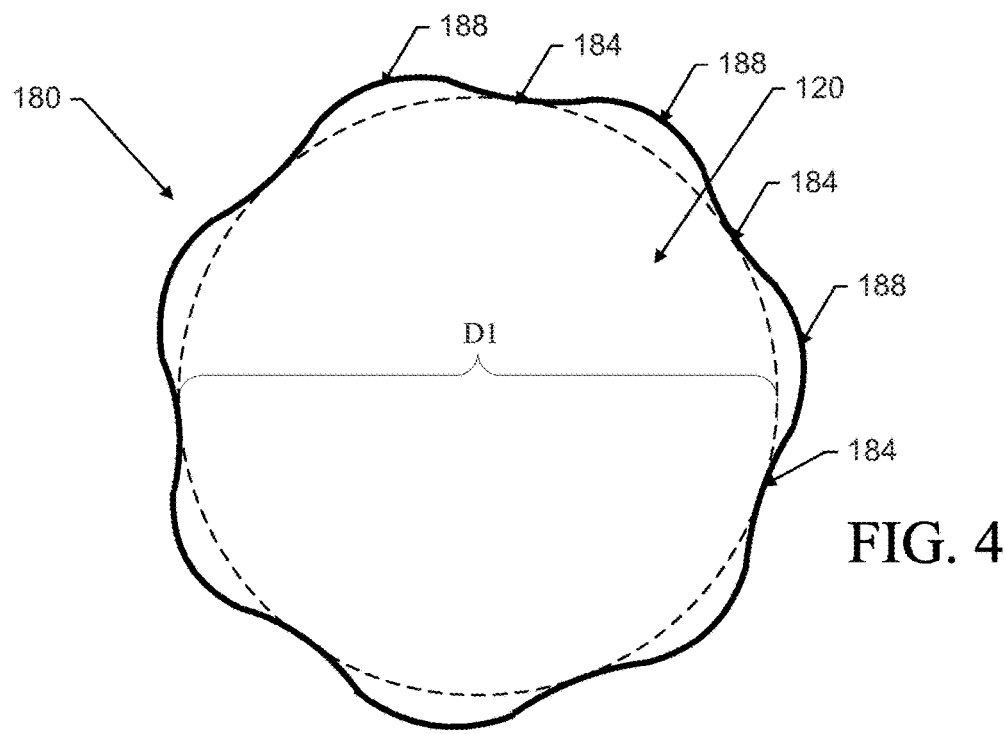
FIG. 4 illustrates a plan view of one cell retainer slot with a cell inserted therein in accordance with an example embodiment.
Figure 5:
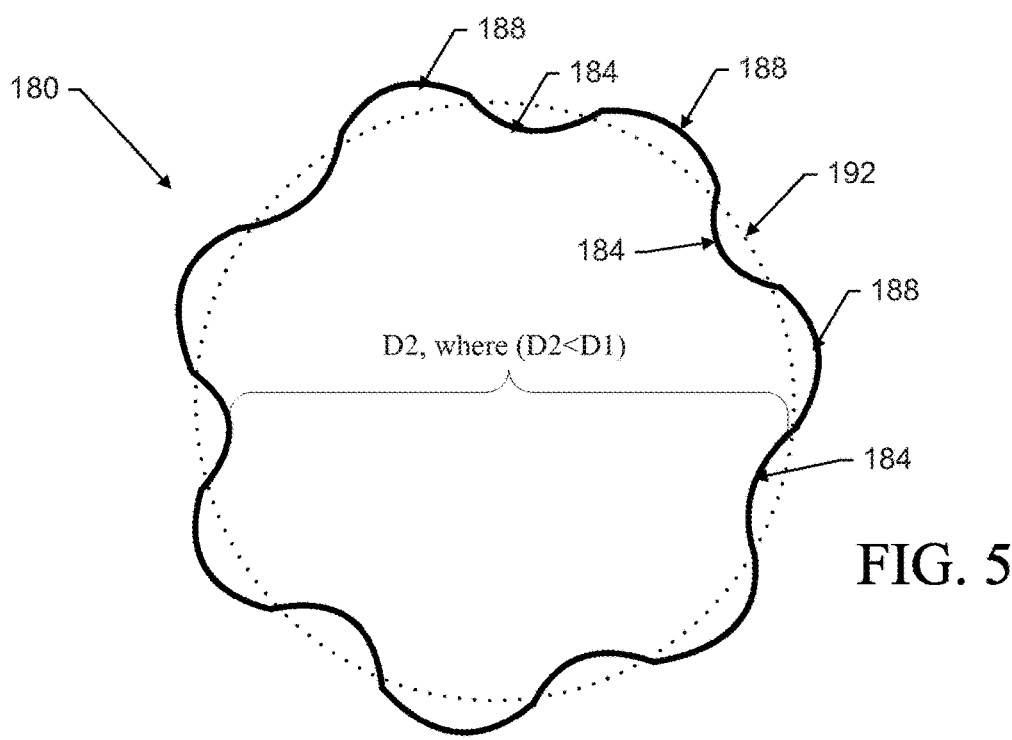
FIG. 5 illustrates a plan view of the cell retainer slot with the cell removed in accordance with an example embodiment.
Figure 6:
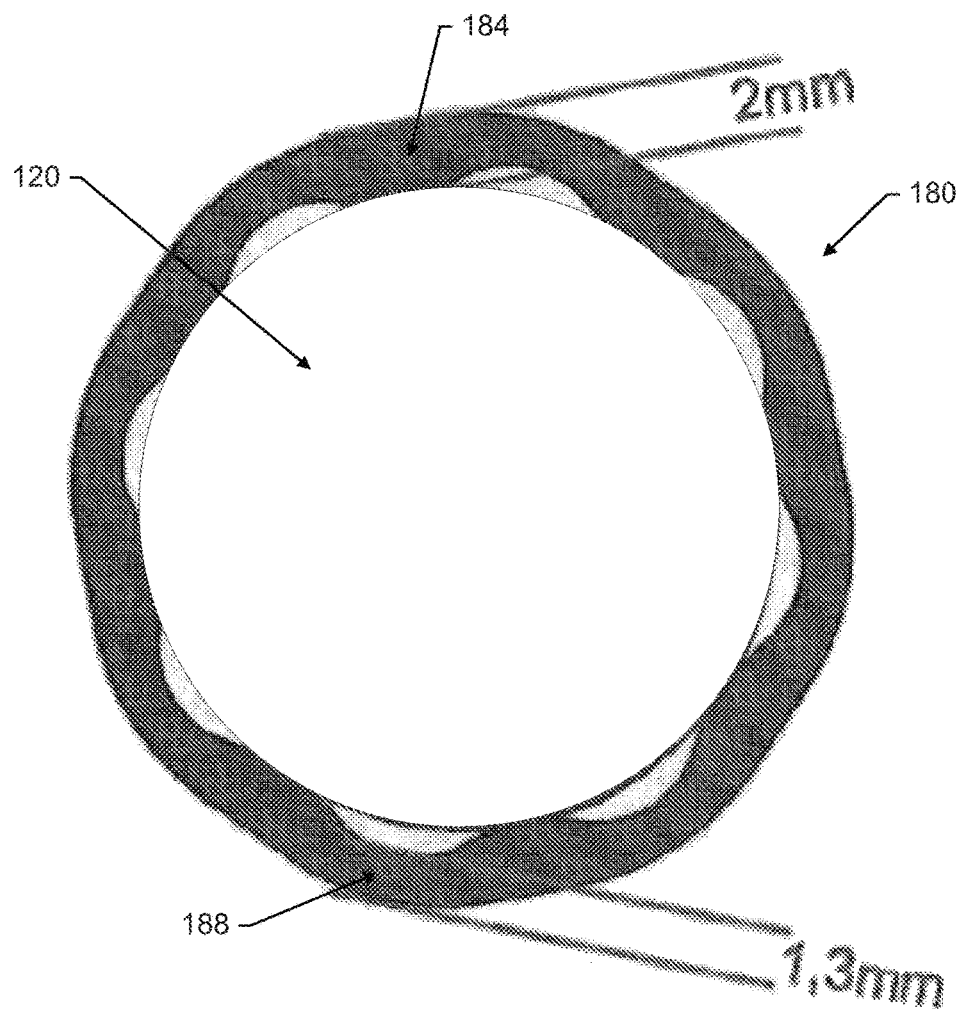
FIG. 6 illustrates a close up, top view of an alternative structure for the cell retainer slot with the cell removed in accordance with an example embodiment.

FIG. 1 illustrates top view down into a portion of a battery pack in accordance with an example embodiment. FIG. 2 illustrates a top view of one portion of a cell retainer assembly of the battery pack in accordance with an example embodiment. FIG. 3 illustrates a perspective view of the portion of the cell retainer assembly of FIG. 2 in accordance with an example embodiment. FIG. 4 illustrates a plan view of one cell retainer slot with a cell inserted therein in accordance with an example embodiment. FIG. 5 illustrates a plan view of the cell retainer slot with the cell removed in accordance with an example embodiment. FIG. 6 illustrates a close up, top view of an alternative structure for the cell retainer slot with the cell removed in accordance with an example embodiment.

An example embodiment of a cell retainer assembly of a battery pack 110 will now be described in reference to FIGS. 1 to 6. The battery pack 110 may include a casing 112 or housing inside which a plurality of battery cells (or cells 120) may be housed. The cells 120 may be arranged within a cell retainer assembly 130. The cell retainer assembly 130 may include a plurality of cell reception slots 140 into which the cells 120 may be disposed and retained. The cell reception slots 140 may be configured to conform approximately to the size and shape of the cells 120 so that the cells 120 may be fixed in place within the cell retainer assembly 130. The cell retainer assembly 130 may further accommodate cell connection circuitry and/or electrodes (e.g., conductors, wires, and/or bars) that may be used to connect cells in series, parallel and/or combinations thereof to achieve the electrical characteristics desired for the battery pack 110.

Each of the cells 120 may be any suitable type of battery cell. For example, the cells 120 may be nickel-metal hydride (NiMH), nickel-cadmium (NiCd), lithium-ion (LIB), or other similar cells. Thus, in some cases, nominal cell voltages may range from about 1V to about 4V. Series connection of multiple cells may be used to increase the voltage rating of the group of connected cells, and parallel connection of multiple cells may be used to increase the power capacity of the battery pack. In some cases, the cells 120 may have a standard size. However, as will be appreciated from the description below, given that the cell retention slots 140 are formed by a cell retention structure that is made from flexible material, and that the cell retention structure is formed to accommodate expansion and contraction, slight differences in the size of the cells 120 may readily be accommodated by the cell retention slots 140. Thus, the cell retention structure may expand to retain cells having a larger diameter within a given range of cell diameters.

In this example, the cell retainer assembly 130 may include a top part 132 and a bottom part 134, each of which may be molded to fit together to retain the cells 120. As such, for example, the top part 132 and the bottom part 134 may each be separately molded such that the cells 120 may be disposed within the bottom part 134 in corresponding cell reception slots formed within the bottom part 134. The top part 132 may then be snapped, screwed, welded or otherwise held in connection with the bottom part 134 in order to form the cell retainer assembly 130 in its assembled form. In some cases, the terms top and bottom may reference portions of the battery pack 110 relative to the back of the user where, when worn by the user, the portion proximate to the user's back is the bottom and the portion located distally relative to the user's back is the top.

As illustrated by the figures, in some embodiments the side walls of the cell retainer assembly 130 have a height slightly greater than the length of a cell 120. Furthermore, the top and bottom walls may at least partially cover the ends of each cell 120 so that, when the top part 132 and bottom part 134 are attached together, the cells 120 are contained and held within the cell retainer assembly 130.

The top part 132 and bottom part 134 may each include respective electrodes for providing the series and/or parallel connection of the cells 120. In some cases, the top part 132 and the bottom part 134 of the cell retainer assembly 130 may fit relatively snugly with opposing ends of the cells 120 and define a free space 150 in which air or another cooling fluid may flow. The free space 150 may be defined between adjacent cells 120 and may be bounded by a top plane formed by the top part 132 and a bottom plane formed by the bottom part 134. Thus, air (or other cooling fluid) flowing in the free space 150 may be prevented from exiting the free space 150 via the end portions of the cells 120. Instead, in some cases, the air may enter the free space 150 in a first direction and be pushed past all of the cells 120 while substantially maintaining the first direction (e.g., moving in a direction out of the page and toward the observer in FIG. 1. After passing by all of the cells 120, the air may exit the cell retainer assembly 130 via outlet air guides in either the first direction, or in a different, second direction. Regardless of how the air enters or exits the portion of the cell retainer assembly 130 in which the cells 120 are housed, the air within the portion of the cell retainer assembly 130 in which the cells 120 are housed may substantially maintain only one direction while passing therethrough. Moreover, the cell retainer assembly 30 may provide for the inlet, outlet and channel fluid paths to be defined entirely between two planes defined by the top and bottom of the top part 132 and bottom part 134, respectively.

It should also be appreciated that the top part 132 and the bottom part 134 may each generally extend between respective top and bottom planes as well. As such, the cells 120 fit into cell reception slots 140 that extend between the top part 132 and the bottom part 134 to form the channel fluid paths in the free space 150 that are bounded between the bottom plane of the top part 132 and the top plane of the bottom part 134.

In some embodiments, the battery pack 110 includes a plurality of cells 120 disposed in a common plane with the longitudinal axis of each cell parallel to the longitudinal axis of each other cell. The cells have generally uniform spacing so as to create a substantially rectangular arrangement of cells that can be series or parallel connected to each other to fit design requirements. In this regard, it will be appreciated that any desirable electrical connection may be employed and any arrangement may be employed in terms of the number of cells in the battery pack 110 and the physical and electrical organization of the cells therein. It should also be appreciated that in some cases, multiple cell packs could be housed within a single cell retainer. The cell packs may then be connected via fuses, switches or other connectors in any desirable manner. Moreover, in some cases, some cell packs may be utilized only under certain circumstances.

In some cases, the cell retainer assembly 130 may include or otherwise be proximate to at least one fan housing 160 disposed at one end of the cell retainer assembly 130. In this embodiment, the fan housing 160 may be integrally formed within the cell retainer assembly 130. However, it could alternatively be attached to the cell retainer assembly 130 or simply placed in operably communication therewith. A fan may be disposed in each fan housing 160 to push (or pull) air through the free space 150. Moreover, although not required, in some cases the free space 150 may include fluid channels defined therein.

Of note, in embodiments where a fluid other than air is used for cooling, the fan housing 160 may instead be replaced with a pump housing that is integrally or adjacently formed with the cell retainer assembly 130 and the fan may be replaced by a pump. Furthermore, although some embodiments may be used for preventing overheating of the battery pack 10, some embodiments could be used similarly for heating a battery pack where the battery pack is used in an extremely cold environment. Instead of blowing air from the environment through the cell retainer assembly 130, heated air could be blown through the cell retainer assembly to warm the battery pack 110 above a predefined minimum threshold temperature.

FIG. 2 illustrates a bottom view of the top part 132 of the battery pack 110 in order to reveal the inner structure of the cell retainer assembly 130 of an example embodiment. Thus, the view is looking into the cell retainer assembly 130 from the perspective of one that could insert a battery cell into the page to insert such cell into the cell retainer assembly 130. It should be appreciated that many embodiments will employ a bottom part 134 that is structured similarly to the structure described in reference to FIG. 2, and the bottom part 134 may substantially fit together with the top part 132 to define a complete cell retainer assembly 130. Thus, a specific example of the bottom part 134 showing a plan view thereof in similar fashion to that which is shown for the top part 132 is not deemed to be necessary.

FIG. 3 illustrates a perspective view of a portion of the top part 132 of FIG. 2. It also shows that although cell retention slots 140 are formed adjacent to each other and, in some cases, connect to each other, gap portions 142 are also provided to allow the walls that form the cell retention slots 140 to expand. Of note, the battery pack 110 in FIG. 2 has ten cells per column and nine cells per row rows to illustrate the fact that any number of cells may be supported by example embodiments. As can be appreciated from the view shown in FIG. 2, the battery cells may be disposed within the cell retainer assembly 130 such that a longitudinal length of the cells extends substantially perpendicular to a direction of the flow of air through the cell retainer assembly 130. The direction of air flow is shown by arrows 170 in FIG. 2.

As shown in FIG. 2, the cells may be held within the cell retainer assembly 130 in the cell reception slots 140, and the walls of the cell reception slots 160 may be referred to as a cell retention structure 180. The cell retention structure 180 may be made from a material that is flexible and has a relatively high elasticity. The cell retention structure 180 may be integrally formed in the cell retainer assembly 130 and may therefore be made of the same material as the cell retainer assembly 130. A flexible plastic material may be chosen for some example embodiments. The flexibility may allow the cell retention structure 180 to expand or contract as needed to accommodate different sized cells or to allow mitigation of impact in the case of impact to the battery pack 110.

As can be appreciated from FIG. 1, the cell retention structure 180 may only engage end portions of the cells 120 to reduce the contact area between the cell retention structure 180 and the cells 120. This may leave a greater surface area of the cells 120 exposed to airflow in the fluid channels to improve heat transfer from the cells 120. In some embodiments, the cell retention structure 180 may engage the cells 120 over less than 25% of the length of the cells 120.

In some embodiments, in order to further facilitate contact between cooling fluid or air and the sides of the cells 120, the cell retention structure 180 may be formed such that it does not have a circular shape. Instead, for example, the cell retention structure 180 may be formed as a ring of material that proceeds in a serpentine or sinuous manner to form the cell reception slots 140 around the circumference of the cells 120. This serpentine or sinuous structure may be provided by forming cell engaging portions 184 that are separated from each other by spacing portions 188. The spacing portions 188 may generally not engage the cells 120 when the cells 120 are inserted into respective ones of the cell reception slots 140. Meanwhile, the cell engaging portions 184 may engage the cells 120 when the cells 120 are inserted into respective ones of the cell reception slots 140. In this way, the cell retention structure 180 may also engage the periphery of the cells 120 over a relatively small portion thereof (e.g., less than 50%), in order to improve airflow along the sides of the cells 120 and to allow for the cells 120 to move in response to a threshold amount of force at least to some degree to mitigate impact forces and avoid damage in the event of an impact causing event. Forces imparted on one cell due to impact can be absorbed in the flexible structure of the cell retainer assembly 130 without propagating through the structure. Thus, while the cell retention structure 180 is generally designed to be rigid enough to provide effective holding of the cells 120 in position, the cell retention structure 180 is also resilient enough to allow some small degree of movement when a threshold amount of force is encountered.

Given that the cell retention structure 180 is made of flexible material, it should be appreciated that the diameter of the cell retention structure 180 may be smaller when no cell is inserted therein. However, when a cell is inserted, the cell may push the cell engaging portions 184 outward to expand the diameter of the cell retention structure 180. When there is no cell inserted, the diameter may be referred to as a relaxed state diameter. When a cell is inserted, the diameter may expand to substantially equal the cell diameter and may be referred to as an expanded state diameter. FIG. 4 shows an example in which the dashed line represents the cell 120 inserted into the cell retention structure 180 causing expansion of the cell engaging portions 184 to accommodate the cell 120 and spread the diameter of the cell retention structure 180 to the expanded state diameter (D1). Meanwhile, FIG. 5 shows the cell retention structure 180 contracted back to its relaxed state at the relaxed state diameter (D2). The circumference of the cell is shown by dotted line 192.

In some embodiments, the cell engaging portions 184 and the spacing portions 188 may be provided to have the same width, but may be bent or curved to achieve the serpentine or sinuous shape desired to decrease the contact area between the cell retention structure 180 and the sidewalls of the cells 120. However, in other embodiments, they may have different widths. For example, in some cases, the thickness of the cell engaging portion 184 may be greater than the thickness of the spacing portion 188. In FIG. 6, the difference may be as much as 30%. However, any suitable width difference may be employed.

It should be noted that the outer shape of the cell retention structure 180 could be round or even somewhat indeterminate in some cases. Instead, the serpentine or sinuous shape could be realized only at the inner surface of the cell retention structure 180. It should also be noted that although FIG. 6 illustrates an example in which there are eight cell engaging portions 184 and eight spacing portions 188 inserted between the respective cell engaging portions 184, any number of cell engaging portions and spacing portions could be used. FIGS. 4 and 5 illustrate an embodiment with seven such portions, but more or fewer could be employed in other embodiments. The resilience of the material and the design allows a biasing force to be generated by the structure to tend to contract the structure to a minimum diameter. When any cell is fit therein, the biasing force causes the cell to be engaged and held in place with some amount of flexibility built in to mitigate impacts.

The serpentine or sinuous shape (with or without different widths at the cell engaging portions 184 and spacing portions 188), coupled with the fact that the material used to make the cell retention structure 180 is flexible or somewhat elastic, means that the cell engaging portions 184 can be pushed outward and the movement can be accommodated by the spacing portions 188. This can enable different sized cells to be used within the same cell retainer assembly 130 or can enable impact mitigation. When different size cells are used, it is normally the case that all cells in a given cell retainer assembly are the same size, but a different battery pack may use the same cell retainer assembly with cells of a different size. The spacing portions 188 also provide a gap next to the surface of the cells to facilitate cooling.

As illustrated in FIGS. 2 and 3, the cell retainer assembly 130 may further include a plurality of ribs 190. As used herein, a rib 190 generally refers to material disposed between adjacent cell reception slots (i.e., between adjacent cells) to inhibit air from flowing in the space between the adjacent cells/cell reception slots. In the embodiments illustrated by the figures, the cell retainer assembly 30 includes ribs 190 between adjacent cells in each column of cells that inhibit air from flowing through the space between adjacent cells in a column. In this way, the free space 150 is partitioned so that airflow channels are created and defined to run parallel to and between adjacent cell columns. As such, the ribs 190 are provided between cells in the same column (but not between cells in the same row) so that air in one airflow channel (defined between columns) is substantially prevented from flowing into another airflow channel. It will be appreciated that, although the embodiments illustrated in the figures show ribs 190 between adjacent cells in a column and airflow channels created between adjacent columns, other embodiments could instead have ribs between adjacent cells in each row that create airflow channels between adjacent rows.

In some embodiments, the ribs 190 may be disposed on substantially opposite sides (e.g., about 180° apart relative to the periphery of the cell reception slots 140 that have adjacent slots on each side) of each of the cells in a column (or row) such that the cell reception slots 140 of each respective column (or row) define a continuous wall that extends from a point where air leaves the inlet to a point where air enters the outlet of the battery pack 110.

In other words, the cell housing 112 of the cell retainer assembly 130 may provide walls formed between adjacent cells (e.g., cells in a same column that are series connected to each other) by the placement of ribs 190 that are positioned 180° apart from each other relative to the circumference of the cell reception slots 140. These walls may be substantially parallel to each other extending from inlet to outlet of the cell housing 112. These ribs 190 may combine with sidewalls of the cell reception slots 140 or the sidewalls of the cells 120 disposed therein to form continuous walls that define parallel fluid flow channels (e.g., airflow channels) in the free space 150 inside the cell housing 112. Given that the cell retention structure 180 typically engages less than 25% of the length of the cells 120, it should be appreciated that the ribs 190 may extend or combine to extend (e.g., when part of the rib is provided on the top part 132 and part is provided on the bottom part 134) to cover the remainder of the length of the cells 120. Thus, for example, each full rib may include a half rib portion provided by each of the top part 132 and the bottom part 134. However, the entirety of the rib 190 may be provided on only one of the top part 132 or the bottom part 134. Alternatively, no ribs may be employed, or ribs may be strategically positioned to achieve any desirable pattern of flow.

In an example embodiment in which the battery pack 110 is provided in a backpack, the battery pack 110 may be oriented such that the fan or fans are proximate to a lower end of the backpack and the outlet is at the top. However, the reverse, or even a cross-flow design, may alternatively be implemented.

As can be appreciated from the example embodiments above, some embodiments may provide a battery pack that may include a cell housing configured to retain a plurality of battery cells and a cell retainer assembly forming a plurality of cell reception slots, the cell reception slots being configured to receive and retain respective ones of the battery cells within the cell housing. At least some of the cell reception slots may be formed by a cell retention structure configured to extend around a periphery of a portion of a corresponding battery cell inserted therein. The cell retention structure may include a series of cell engaging portions separated from each other by respective spacing portions. The cell retention structure may be formed of flexible material.

In some cases, modifications or amplifications may further be employed as optional alterations or augmentations to the description above. These alterations or augmentations may be performed exclusive of one another or in any combination with each other. In some cases, such modifications or amplifications may include (1), the cell retention structure may be configured to define a relaxed state diameter when no battery cell is inserted therein and an expanded state diameter that is larger than the relaxed state diameter responsive to insertion of the corresponding battery cell therein. In an example embodiment (2), the cell engaging portions and the spacing portions form a continuous serpentine loop around the periphery of the portion of the corresponding battery cell. In some cases (3), the cell retention structure engages the corresponding battery cell over less than 25% of a length of the corresponding battery cell responsive to insertion of the corresponding battery cell into the cell retention structure. In some embodiments (4), the cell retention structure engages the corresponding battery cell over less than 50% of a circumference of the corresponding battery cell responsive to insertion of the corresponding battery cell into the cell retention structure. In an example embodiment (5), a width of the cell retention structure may be the same at the cell engaging portions and at the spacing portions. In some cases (6), a width of the cell retention structure may be the different at the cell engaging portions than at the spacing portions. In some embodiments (7), the cell reception slots are positioned within the cell retainer assembly to define at least one fluid flow channel extending substantially in a first direction through the cell housing, and the fluid flow channel may be defined at least partially by a rib extending between at least two adjacent cell reception slots to inhibit a cross-flow of fluid between the at least two adjacent cell reception slots in a direction other than the first direction. In an example embodiment (8), the fluid flow channel may be configured such that the fluid will move through the fluid flow channel substantially perpendicular to a longitudinal axis of the battery cells. In some cases (9), the cell reception slots may be defined between two parallel planes that lie substantially perpendicular to a longitudinal axis of the battery cells, and the ribs may extend substantially perpendicular to the two parallel planes away from a space defined between the two parallel planes.

In an example embodiment, none, any or all of modifications/amplifications (1) to (9) may be employed and the battery pack may further include a fan configured to operate to force air through the fluid flow channel. In some cases, none, any or all of modifications/amplifications (1) to (9) may be employed and the cell retainer assembly may include a top part forming substantially a top half of the cell retainer assembly and a bottom part forming substantially a bottom half of the cell retainer assembly. The top part and bottom part may fit together to form the cell retainer assembly. In such an example, the cell retention structures of the top part may not contact cell retention structures of the bottom part. Alternatively or additionally, ribs formed proximate to the cell retention structures of the top part may extend to contact ribs formed proximate to the cell retention structures of the bottom part. In an example embodiment, none, any or all of modifications/amplifications (1) to (9) may be employed and the battery pack may be provided in a backpack of a battery powered outdoor power equipment device.

Example embodiments may provide a cell retention assembly that has relatively little obstruction of the surface area of the cells that are retained so that effective cooling can be accomplished. However, the cell retention assembly also provides for flexibility to mitigate impact damage by enabling impact forces to be absorbed readily with damage not being transferred (or minimally being transferred) between cells. Moreover, cells of different sizes can be accommodated by the same cell retention assembly. In this regard, for example, a single cell retainer assembly design can be mass produced from molded plastic (e.g., Acrylonitrile Butadiene Styrene (ABS) or like materials) that is flexible, elastic, and/or resilient. The single cell retainer assembly design may then be employed in different battery packs with different cell sizes within a selected range of cell diameters that the single cell retainer assembly design is rated to accommodate.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A battery pack comprising:
a housing configured to retain a plurality of battery cells; and
a cell retainer assembly forming a plurality of cell reception slots configured to receive and retain respective ones of the battery cells within the housing, at least some of the cell reception slots being formed by a flexible cell retention structure configured to extend around a periphery of a portion of a corresponding battery cell inserted therein,
wherein the flexible cell retention structure comprises a serpentine structure configured to mitigate impact forces, the serpentine structure comprising a series of cell engaging portions separated from each other by respective spacing portions, and
wherein a length of the flexible cell retention structure engages the corresponding battery cell over less than 25% of a length of the corresponding battery cell responsive to insertion of the corresponding battery cell into the flexible cell retention structure.

2. The battery pack of claim 1, wherein the flexible cell retention structure is configured to define a relaxed state diameter when no battery cell is inserted therein and an expanded state diameter that is larger than the relaxed state diameter responsive to insertion of the corresponding battery cell therein.

3. The battery pack of claim 1, wherein the cell engaging portions and the spacing portions form a continuous serpentine loop around the periphery of the portion of the corresponding battery cell.

4. The battery pack of claim 1, wherein the flexible cell retention structure engages the corresponding battery cell over less than 50% of a circumference of the corresponding battery cell responsive to insertion of the corresponding battery cell into the flexible cell retention structure.

5. The battery pack of claim 1, wherein a width of the flexible cell retention structure is the same at the cell engaging portions and at the spacing portions.

6. The battery pack of claim 1, wherein a width of the flexible cell retention structure is different at the cell engaging portions than at the spacing portions.

7. The battery pack of claim 1, wherein the cell reception slots are positioned within the cell retainer assembly to define at least one fluid flow channel extending substantially in a first direction through the housing, the fluid flow channel being defined at least partially by a rib extending between at least two adjacent cell reception slots to inhibit a cross-flow of fluid between the at least two adjacent cell reception slots in a direction other than the first direction.

8. The battery pack of claim 7, wherein the fluid flow channel is configured such that the fluid will move through the fluid flow channel substantially perpendicular to a longitudinal axis of the battery cells.

9. The battery pack of claim 1, wherein the cell reception slots are defined between two parallel planes that lie substantially perpendicular to a longitudinal axis of the battery cells, and wherein ribs extend substantially perpendicular to the two parallel planes away from a space defined between the two parallel planes.

10. The battery pack of claim 1, further comprising a fan configured to operate to force air through the fluid flow channel.

11. The battery pack of claim 1, wherein the cell retainer assembly includes:
a top part forming substantially a top half of the cell retainer assembly; and
a bottom part forming substantially a bottom half of the cell retainer assembly, the top part and bottom part fitting together to form the cell retainer assembly,
and wherein cell retention structures of the top part do not contact cell retention structures of the bottom part.

12. The battery pack of claim 1, wherein the cell retainer assembly includes:
a top part forming substantially a top half of the cell retainer assembly; and
a bottom part forming substantially a bottom half of the cell retainer assembly, the top part and bottom part fitting together to form the cell retainer assembly,
wherein cell retention structures of the top part do not contact cell retention structures of the bottom part, and wherein ribs formed proximate to the cell retention structures of the top part extend to contact ribs formed proximate to the cell retention structures of the bottom part.

13. The battery pack of claim 1, wherein the battery pack is provided in a backpack of a battery powered outdoor power equipment device.

14. A cell retainer assembly for a battery powered, outdoor power equipment device, the cell retainer assembly comprising:
a plurality of cell reception slots configured to receive and retain respective ones of battery cells;
a plurality of flexible cell retention structures, at least some of the cell reception slots being formed by corresponding ones of the flexible cell retention structures, at least one cell retention structure being configured to extend around a periphery of a portion of a corresponding battery cell inserted therein,
wherein the at least one flexible cell retention structure comprises a serpentine structure configured to mitigate impact forces, the serpentine structure comprising a series of cell engaging portions separated from each other by respective spacing portions, and
wherein a length of the at least one flexible cell retention structure engages the corresponding battery cell over less than 25% of a length of the corresponding battery cell responsive to insertion of the corresponding battery cell into the at least one flexible cell retention structure.

15. The cell retainer assembly of claim 14, wherein the at least one flexible cell retention structure is configured to define a relaxed state diameter when no battery cell is inserted therein and an expanded state diameter that is larger than the relaxed state diameter responsive to insertion of the corresponding battery cell therein.

16. The cell retainer assembly of claim 14, wherein the cell engaging portions and the spacing portions form a continuous serpentine loop around the periphery of the portion of the corresponding battery cell.

17. The cell retainer assembly of claim 14, wherein the at least one flexible cell retention structure engages the corresponding battery cell over less than 50% of a circumference of the corresponding battery cell responsive to insertion of the corresponding battery cell into the at least one flexible cell retention structure.

18. The cell retainer assembly of claim 14, wherein a width of the at least one flexible cell retention structure is the same at the cell engaging portions and at the spacing portions.

* * * * *